(12) United States Patent
Park

(10) Patent No.: US 7,583,339 B2
(45) Date of Patent: Sep. 1, 2009

(54) LIQUID CRYSTAL DISPLAY DEVICE AND FABRICATING THE SAME

(75) Inventor: Ku-Hyun Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 195 days.

(21) Appl. No.: 11/798,300

(22) Filed: May 11, 2007

(65) Prior Publication Data

US 2008/0002071 A1    Jan. 3, 2008

(30) Foreign Application Priority Data

Jun. 29, 2006   (KR) ..................... 10-2006-0059391
Apr. 10, 2007   (KR) ..................... 10-2007-0035226

(51) Int. Cl.
    *G02F 1/1335*    (2006.01)
(52) U.S. Cl. .................... 349/114; 349/96; 349/117; 349/119; 349/187; 349/139
(58) Field of Classification Search ................. 349/33, 349/96, 114, 117, 119, 129, 139, 141–146, 349/187

See application file for complete search history.

(56) References Cited

U.S. PATENT DOCUMENTS

| | | | |
|---|---|---|---|
| 7,027,116 B2 * | 4/2006 | Ohmuro et al. | 349/114 |
| 7,502,084 B2 * | 3/2009 | Nishimura | 349/114 |
| 2008/0030663 A1 * | 2/2008 | Igeta et al. | 349/114 |

* cited by examiner

*Primary Examiner*—Ellen Kim
(74) *Attorney, Agent, or Firm*—Holland & Knight LLP

(57) ABSTRACT

A liquid crystal display device includes first and second substrates facing each other and including transmissive and reflective regions, a first electric field distorting unit disposed in the transmissive region on one of the first and second substrates and having a first bent shape, a second electric field distorting unit disposed in the reflective region on one of the first and second substrates and having a second bent shape, and a liquid crystal layer interposed between the first and second substrates, wherein the first bent shape has a first angle with respect to a first vertical direction of a first symmetrical axis of the first bent shape and the second bent shape has a second angle with respect to a second vertical direction of a second symmetrical axis of the second bent shape, and the first angle is different from the second angle.

20 Claims, 13 Drawing Sheets

LIQUID CRYSTAL DISPLAY DEVICE AND FABRICATING THE SAME

The present application claims the benefit of Korean Patent Application Nos. 10-2006-0059391 filed in Korea on Jun. 29, 2006 and 10-2007-0035226 filed in Korea on Apr. 10, 2007, which are hereby incorporated by reference in their entirety.

BACKGROUND OF THE INVENTION

1. Field of the Invention

Embodiments of the present invention relate to a display device, and more particularly, to a liquid crystal display (LCD).

2. Discussion of the Related Art

The related art LCD devices use an optical anisotropic property and polarization properties of liquid crystal molecules to display images. The liquid crystal molecules have orientation characteristics of arrangement resulting from their thin and long shape. Thus, an arrangement direction of the liquid crystal molecules can be controlled by applying an electrical field to them. Accordingly, when the electric field is applied to them, a polarization properties of light is changed according to the arrangement of the liquid crystal molecules such that the LCD devices display images.

Among these LCD devices, the vertically aligned (VA) mode LCD device has an excellent contrast ratio and a wide viewing angle. The VA mode liquid crystal molecules having an anisotropic dielectric constant of negative value are used for the VA mode LCD device. As a result, when the electric field is not applied to the VA mode liquid crystal molecules, the VA mode liquid crystal molecules are arranged such that the major axis of them is perpendicular to substrates of the VA mode LCD device.

The VA mode transflective LCD device, which is capable of having reflective and transmissive modes, has the advantage of low power consumption. The VA mode transflective LCD device can have a different cell gap in the transmissive region than in the reflective region. Such a device is called a dual cell gap type. However, since a process of fabricating the VA mode transflective LCD device having a dual cell gap type is very complicated, production yield is decreased. Moreover, there is a problem of disinclination because of a step between the transmissive and reflective regions.

To resolve these problems, new VA mode transflective LCD device having a single cell gap in both the transmissive and reflective regions has been suggested. In other words, a single cell gap type VA mode transflective LCD. However, the VA mode reflective LCD device having the single cell gap type has great differences between a voltage-transmittance (V-T) characteristic in the transmissive mode and a voltage-reflectance (V-R) characteristic in the reflective mode.

FIG. 1 is a graph showing a V-T characteristic and a V-R characteristic of a VA mode transflective LCD device having a single cell gap type according to the related art. As shown in FIG. 1, the V-T and V-R curves have different patterns. The V-R curve has a positive slope according to the voltage and has a maximum reflectance value. And then, the V-R curve has a negative slope according to voltage at more than the voltage at the maximum reflectance value. On the other hand, the V-T curve has only a positive slope that crosses the negative slope of the V-R curve. Accordingly, to resolve display brightness problems because of the difference between V-T and V-R characteristics, a complicated driving method, for example, a dual gamma method, is necessary that increases production cost increases.

SUMMARY OF THE INVENTION

Accordingly, embodiments of the present invention are directed to a liquid crystal display device that substantially obviates one or more of the problems due to limitations and disadvantages of the related art.

An object of embodiments of the present invention is to provide a liquid crystal display device that has high production yield and low production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes first and second substrates facing each other and including transmissive and reflective regions, a first electric field distorting unit disposed in the transmissive region on one of the first and second substrates and having a first bent shape, a second electric field distorting unit disposed in the reflective region on one of the first and second substrates and having a second bent shape, and a liquid crystal layer interposed between the first and second substrates, wherein the first bent shape has a first angle with respect to a first vertical direction of a first symmetrical axis of the first bent shape and the second bent shape has a second angle with respect to a second vertical direction of a second symmetrical axis of the second bent shape, and the first angle is different from the second angle.

In another embodiment, a liquid crystal display device includes first and second substrates facing each other and including transmissive and reflective regions, and a liquid crystal layer between the first and second substrates, wherein the liquid crystal display device generates a first electric field having a first angle in the transmissive region and a second electric field having a second angle in the reflective region, the first and second angles different from each other with respect to a first plane parallel to one of the first and second substrates and a second plane vertical to one of the first and second substrates.

In a further embodiment, a method of fabricating a liquid crystal display device includes providing first and second substrates, forming a first electric field distorting unit disposed in the transmissive region on one of the first and second substrates and having a first bent shape, forming a second electric field distorting unit disposed in the reflective region on one of the first and second substrates and having a second bent shape, and forming a liquid crystal layer interposed between the first and second substrates, wherein the first bent shape has a first angle with respect to a first vertical direction of a first symmetrical axis of the first bent shape and the second bent shape has a second angle with respect to a second vertical direction of a second symmetrical axis of the second bent shape, and the first angle is different from the second angle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 2:
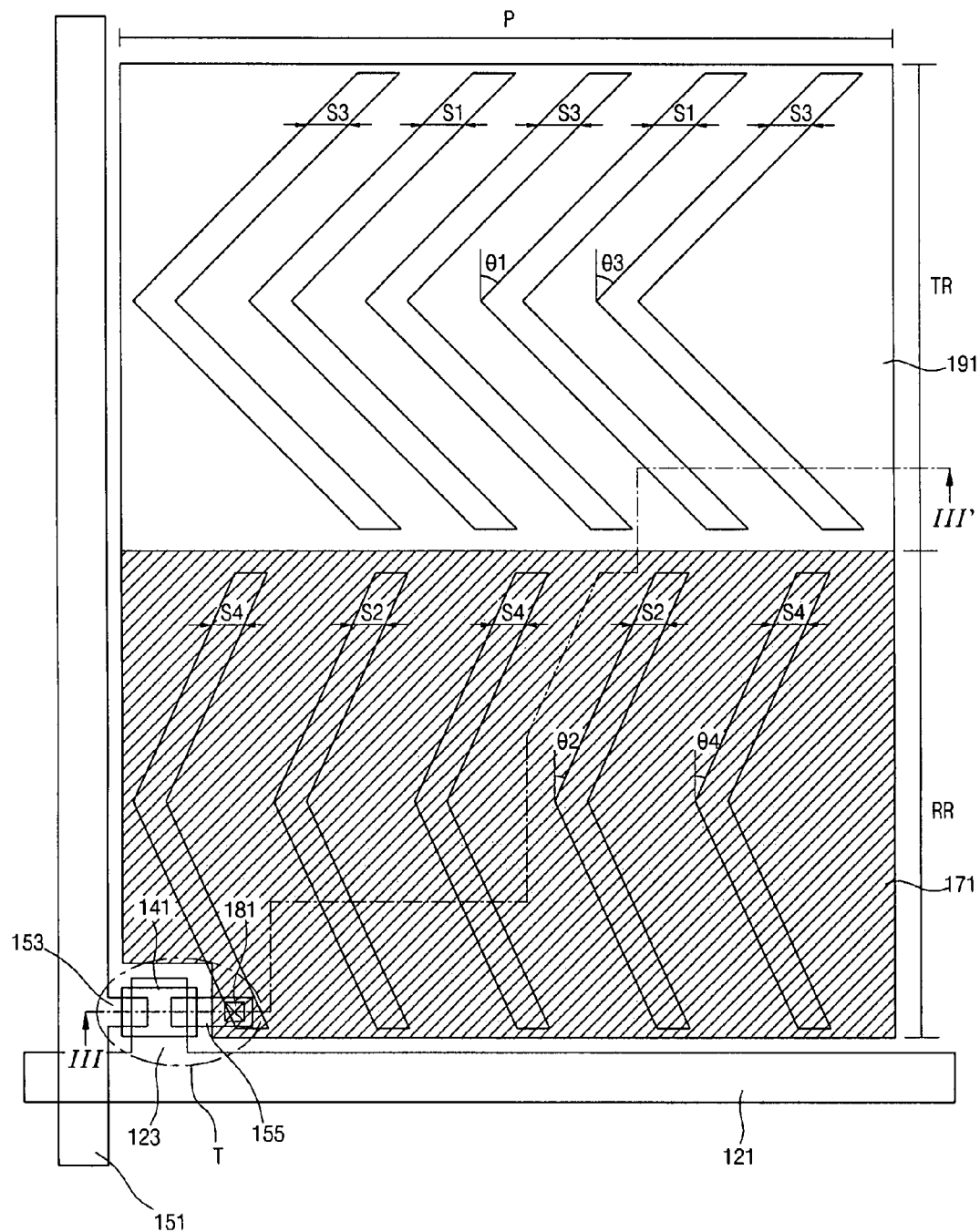
FIG. 2 is a plan view of a VA mode transflective LCD device according to a first exemplary embodiment of the present invention.
Figure 3:
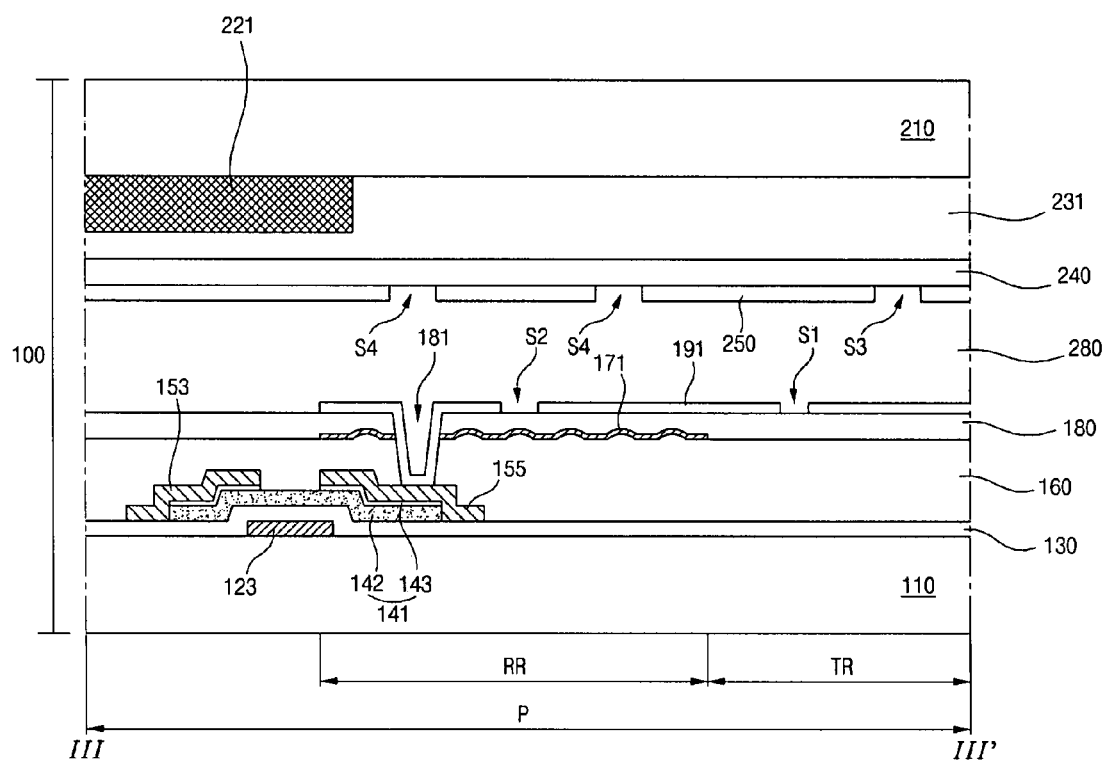
FIG. 3 is a cross-sectional view taken along line III-III' of FIG. 2.

FIG. 2 is a plan view of a VA mode transflective LCD device according to a first exemplary embodiment of the present invention. FIG. 3 is a cross-sectional view taken along line III-III' of FIG. 2. As shown in FIGS. 2 and 3, the VA mode transflective LCD device according to the first exemplary embodiment of the present invention has substantially the same cell gap in both the transmissive region TR and the reflective region RR.

The VA mode transflective LCD device includes first and second substrates 110 and 210 facing each other. A liquid crystal layer 280 is interposed therebetween. The liquid crystal layer 280 includes VA mode liquid crystal molecules. The VA mode liquid crystal molecules have an anisotropic dielectric constant of negative value.

Gate and data lines 121 and 151 are formed on the first substrate 110. The gate and data lines 121 and 151 cross each other to define a pixel region P. The pixel region P includes a transmissive region TR and a reflective region RR. A thin film transistor (TFT) T, which includes a gate electrode 123, a semiconductor layer 141 and source and drain electrodes 153 and 155, is formed adjacent to where the gate and data lines 121 and 151 cross each other. The gate electrode 123 extends from the gate line 121, and the semiconductor layer 141 is formed on the gate electrode 123 with a gate insulating layer 130 interposed therebetween. The semiconductor layer 141 includes an active layer 142 and an ohmic contact layer 143. The source electrode 153 extends from the data line 151 and is separated from the drain electrode 155. The source and drain electrodes 153 and 155 are formed on the semiconductor layer 141.

A first passivation layer 160 is formed on the TFT T. A portion of the upper surface of the first passivation layer 160 has an uneven shape. The uneven shape is disposed in the reflective region RR. A reflective electrode 171 is formed on the first passivation layer 160 in the reflective region RR such that the reflective electrode 171 has the uneven shape. A second passivation layer 180 is formed on the reflective electrode 171. The first and second passivation layers 160 and 180 have a drain contact hole 181. The drain contact hole 181 exposes the drain electrode 155. The drain contact hole 181 is formed where the reflective electrode 171 is formed such that the drain contact hole 181 is also made through the reflective electrode 171. A transmissive electrode 191 is formed of a transparent conductive material on the second passivation layer 180 in the transmissive and reflective regions TR and RR. The transparent conductive material can include one of indium-tin-oxide (ITO) and indium-zinc-oxide (IZO). The transmissive electrode 191 is connected to the drain electrode 155 through the drain contact hole 181. The transmissive electrode 191 is also connected to the reflective electrode 171.

A black matrix 221, a color filter layer 231, a planarization layer 240 and a common electrode 250 are sequentially formed on the second substrate 210. The black matrix 221 corresponds to the gate line 121, the data line 151 and the TFT T. Further, the black matrix 221 has openings corresponding to the pixel region P. The color filter layer 231 is formed on the black matrix 221 and in the openings. The color filter layer 231 may include one of red, green and blue colors. A planarization layer 240 is formed on the color filter layer 231. The common electrode 250 is formed on the planarization layer 240 to face the transmissive electrode 191. The common electrode 250 is formed of the transparent conductive material including one of ITO and IZO. An electric field is induced between the transmissive electrode 191 and the common electrode 250.

The transmissive electrode 191 includes first and second slits S1 and S2 in transmissive and reflective regions TR and RR, respectively. Similarly, the common electrode 250 includes third and fourth slits S3 and S4 in the transmissive and reflective regions TR and RR, respectively. In other words, the third slit S3 corresponds to the first slit S1, and the fourth slit S4 corresponds to the second slit S2. The first slit S1 is alternately arranged with or offset to the third slit S3, and the second slit S2 is alternately arranged with or offset to the fourth slit S4. The electric field between the transmissive and common electrodes 191 and 250 is distorted by the first to fourth slits S1 to S4.

The first to fourth slits S1 to S4 have a chevron shape. In other words, a center portion of the first to fourth slits S1 to S4 is bent. The first to fourth slits S1 to S4 can have more than two bent portions. The first and second slits S1 and S2 have different chevron shapes. In other words, the bent portions of the first and second slits S1 and S2 have different angles. The bent portion of the first slit S1 has a first angle $\theta 1$ greater than a second angle $\theta 2$ of the bent portion of the second slit S2. Similarly, the bent portion of the third slit S3 has a third angle $\theta 3$ greater than a fourth angle $\theta 4$ of the bent portion of the fourth slit S4. The first to fourth angles $\theta 1$ to $\theta 4$ are defined with respect to a vertical direction to a symmetrical axis SA of the first to fourth slits S1 to S4. The first and third angles $\theta 1$ and $\theta 3$ can be between 30 degrees and 60 degrees, and the second and fourth angles $\theta 2$ to $\theta 4$ can be between 10 degrees and 30 degrees. The first and third angles $\theta 1$ and $\theta 3$ can be 45 degrees, and the second and fourth angles $\theta 2$ to $\theta 4$ can be 22.5 degrees. In other words, the first and third angles $\theta 1$ and $\theta 3$ can be twice as much as the second and fourth angles $\theta 2$ to $\theta 4$. The first and third angles $\theta 1$ and $\theta 3$ can have the same value, and the second and fourth angles $\theta 2$ to $\theta 4$ can have the same value. The first to fourth slits can have the chevron shape shown in FIGS. 2 and 3 to provide a wide viewing angle. Alternatively, the first to fourth slits may have a linear bar shape.

The electric fields in the transmissive and reflective regions TR and RR are various depending on shapes of the first to fourth slits S1 to S4. In embodiments of the present invention, the VA mode liquid crystal molecules are used for the liquid crystal layer 280. As a result, the major axis of the liquid crystal molecules are arranged to be perpendicular to the first and second substrates 110 and 210 without the electric field between the transmissive and common electrodes 191 and 250. On the other hand, the major axis of the liquid crystal molecules are arranged perpendicular to an electric field between the transmissive and common electrodes 191 and 250.

Figure 4:
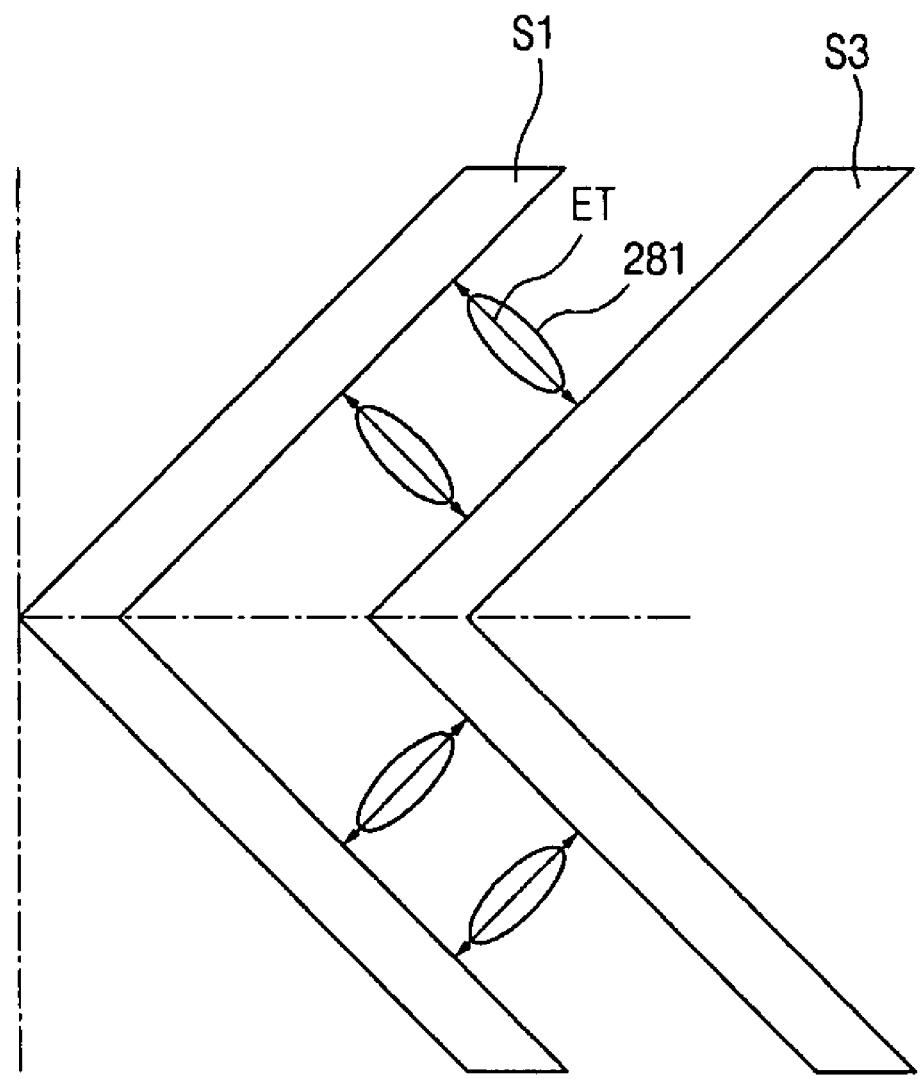
FIG. 4 is a schematic plan view showing an electric field and an arrangement of liquid crystal molecules in a transmissive region of a VA mode transflective LCD device shown in FIG. 2.
Figure 5:
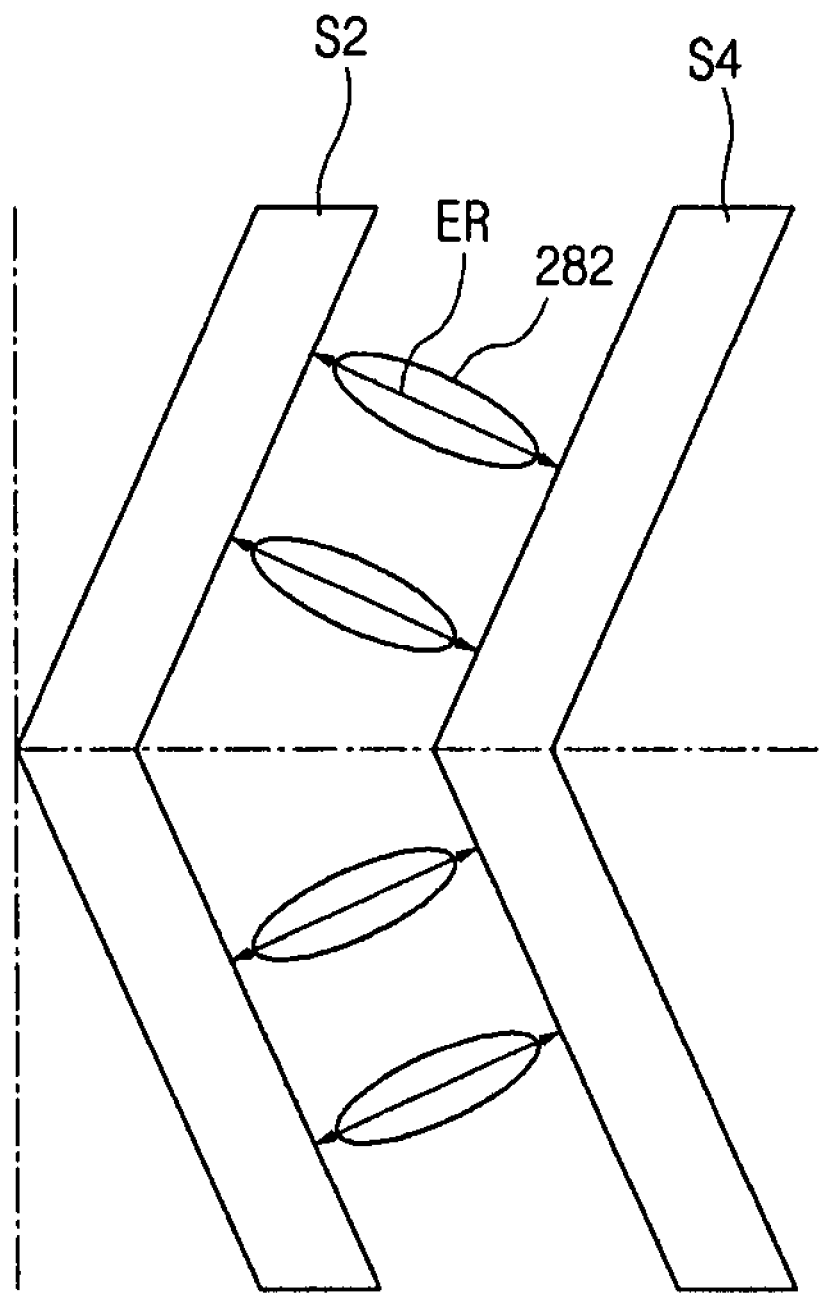
FIG. 5 is a schematic plan view showing an electric field and an arrangement of liquid crystal molecules in a reflective region of a VA mode transflective LCD device shown in FIG. 2.

FIG. 4 is a schematic plan view showing an electric field and an arrangement of liquid crystal molecules in a transmissive region of a VA mode transflective LCD device shown in FIG. 2, and FIG. 5 is a schematic plan view showing an electric field and an arrangement of liquid crystal molecules in a reflective region of a VA mode transflective LCD device shown in FIG. 2. The electric field in the transmissive and reflective regions have different directions due to the different angles of the bent portions of the slits in the transmissive and reflective regions TR and RR.

As shown in FIG. 4, in a plan view of the transmissive region TR (of FIG. 3), the electric field ET between the transmissive and common electrodes 191 and 250 (of FIG. 3) is inclined to the symmetrical axis SA of the first and third slits S1 and S3 depending on the first and third angles $\theta 1$ and $\theta 3$. Summation of the angle of the electric field ET to the symmetrical axis SA and one of the first and third angles $\theta 1$ and $\theta 3$ can be 90 degrees. Moreover, although not shown, the electric field is inclined with respect to a vertical line to the substrates. The major axis of liquid crystal molecules 281 is perpendicular to the electric field ET. The angle of the major axis of the liquid crystal molecules 281 with respect to the symmetrical axis SA can be same as one of the first and third angles $\theta 1$ and $\theta 3$. In two portions separated by the symmetrical axis SA, the arrangements of the liquid crystal molecules 281 are symmetric to each other.

As shown in FIG. 5, in a plan view of the reflective region RR (of FIG. 3), the electric field ER between the transmissive and common electrodes 191 and 250 (of FIG. 3) is inclined to the symmetrical axis SA of the second and fourth slits S2 and S4 depending on the second and fourth angles $\theta 2$ and $\theta 4$. Summation of the angle of the electric field ER to the symmetrical axis SA and one of the second and fourth angles $\theta 2$ and $\theta 4$ can be 90 degrees. Moreover, although not shown, the electric field is inclined with respect to a vertical line to the substrates. The major axis of liquid crystal molecules 282 is perpendicular to the electric field ER. The angle of the major axis of the liquid crystal molecules 282 with respect to the symmetrical axis SA can be same as one of the second and fourth angles $\theta 2$ and $\theta 4$. In two portions separated by the symmetrical axis SA, the arrangements of the liquid crystal molecules 282 are symmetric to each other.

As shown in FIGS. 4 and 5, the liquid crystal molecules 281 and 282 in the transmissive and reflective regions TR and RR are arranged at different angles. As a result, when the same voltage is applied to the transmissive and common electrodes 191 and 250, the liquid crystal molecules 281 and 282 in the transmissive and reflective regions TR and RR have different effective phase difference values. For example, when the first angle $\theta 1$ is different from the second angle $\theta 2$, the phase difference value of the liquid crystal molecules 281 is the same as the phase difference value of the liquid crystal molecules 282, and but the light passed through the liquid crystal layer in the transmissive and reflective regions is differently polarized. Accordingly, even if the cell gap in the transmissive and reflective regions TR and RR is same, the V-T characteristic in the transmissive region TR and the V-R characteristic in the reflective region RR can be controlled to have substantially the same curve in each of the regions such that the display brightness problems of the related art can be resolved. The VA mode transflective LCD device having a single cell gap is able to display excellent images without dual gamma method. Since there is no necessary of driving circuits for the dual gamma method, production cost is reduced. Moreover, the VA mode transflective LCD device with the single cell gap has improved production yield.

With regard to FIGS. 2 and 3, a method of fabricating the VA mode transflective LCD device according to the first exemplary embodiment of the present invention is explained. An array substrate of the VA mode transflective LCD device is manufactured by a process as following.

First, the gate line 121 and the gate electrode 123 are formed on the first substrate 110 by depositing and patterning a first metal material. The gate electrode 123 extends from the gate line 121. Then, the gate insulating layer 130 is formed on the gate line 121 and gate electrode 123.

Next, the active layer 142 and the ohmic contact layer 143 are formed on the gate insulating layer 130 by sequentially depositing and patterning pure amorphous silicon (a:Si—H) and impurity-doped amorphous silicon (n+ or p+ a-Si:H). The active layer 142 and the ohmic contact layer 143 constitute the semiconductor layer 141.

Next, the data line 151 and the source and drain electrodes 153 and 155 are formed on the semiconductor layer 141 by depositing and patterning a second metal material. The source electrode 153 extends from the data line 151 and is separated from the drain electrode 155.

Next, the passivation layer 160 having a portion with an uneven upper surface is formed on the data line 151 and the source and drain electrodes 153 and 155. The uneven shape is disposed in the reflective region RR.

Next, the reflective electrode 171 is formed on the first passivation layer 160 in the reflective region RR by deposing and patterning a third metal material. The third metal material has excellent reflectance.

Next, the second passivation layer 180 is formed on the reflective electrode 171. The first and second passivation layers 160 and 180 are patterned to form the drain contact hole 181 exposing the drain electrode 155.

Next, the transmissive electrode 191 having the first and second slits S1 and S2 is formed on the second passivation layer 180 by depositing and patterning the transparent conductive material. The transmissive electrode 191 is connected to the drain electrode 155 through the drain contact hole 181. The transmissive electrode 191 can be connected to the reflective electrode 171 through the drain contact hole 181. The first and second slits S1 and S2 are formed in the transmissive and reflective regions TR and RR.

A color filter substrate of the VA mode transflective LCD device is manufactured as follows. First, the black matrix 221 is formed on the second substrate 210 by depositing and patterning one of black resin and chromium. The black matrix 221 corresponds to the gate line 121, the data line 151 and the TFT T and includes the openings corresponding to the pixel region P.

Next, the color filter layer 231 is formed on the black matrix in the openings by depositing and patterning color resin. The color filter layer 231 has one of red, green and blue colors.

Next, the planarization layer 240 is formed on the black matrix 221 and the color filter layer 231. The planarization layer 240 has a flat upper surface.

Next, the common electrode 250 having the third and fourth slits S3 and S4 is formed on the planarization layer 240 by depositing and patterning the transparent conductive material, such as ITO and IZO. The third and fourth slits S3 and S4 are disposed in the transmissive and reflective regions TR and RR, respectively. The third slit S3 is alternately arranged with the first slit S1 of the transmissive electrode 191, and the fourth slit S4 is alternately arranged with the second slit S2 of the transmissive electrode 191.

The array substrate and the color filter substrate are attached by using a seal pattern to form a space between the array substrate and color filter substrate. Then, the VA mode transflective LCD device is manufactured by forming the VA mode liquid crystal layer in the space.

Figure 6:
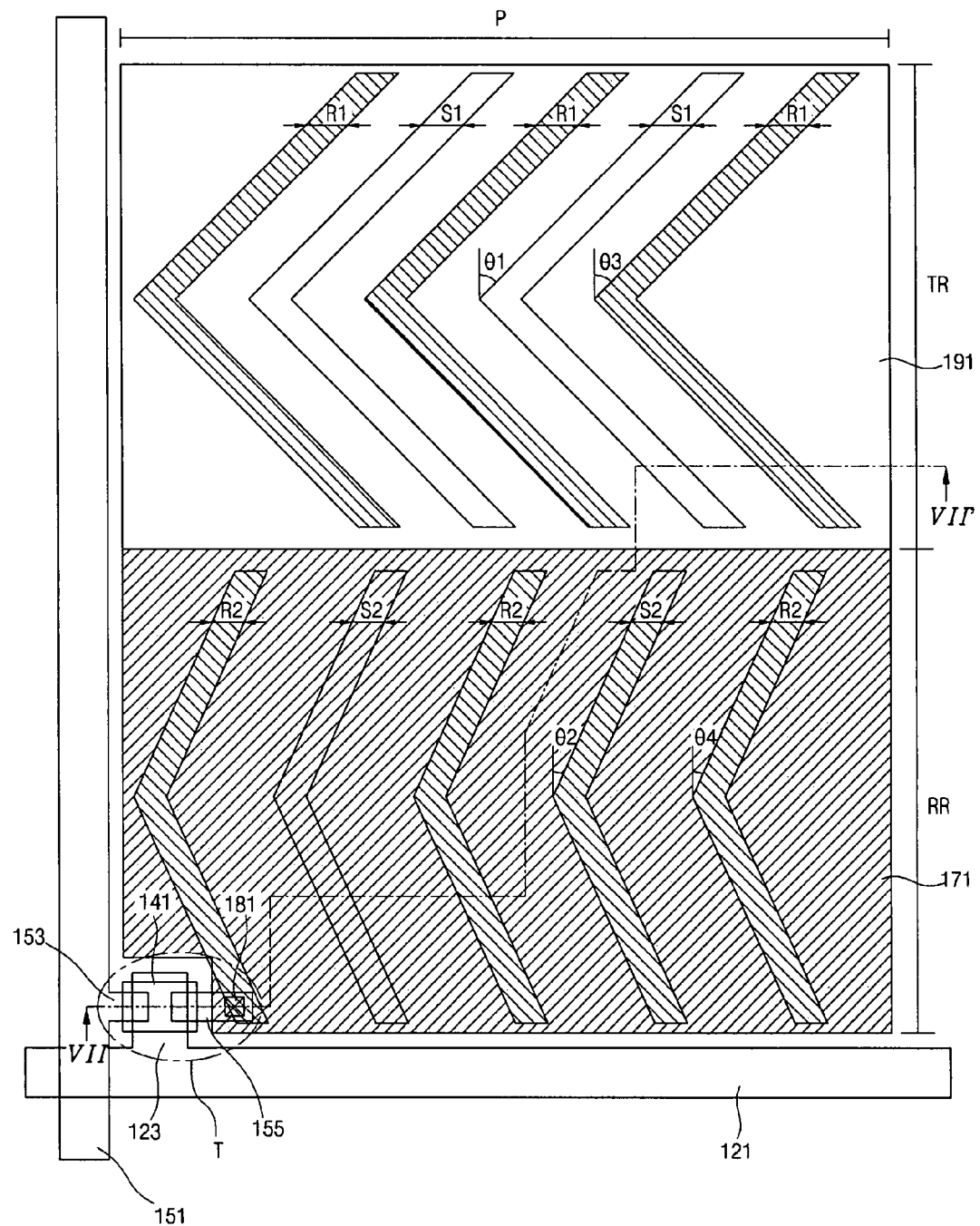
FIG. 6 is a plan view of a VA mode transflective LCD device according to a second exemplary embodiment of the present invention.
Figure 7:
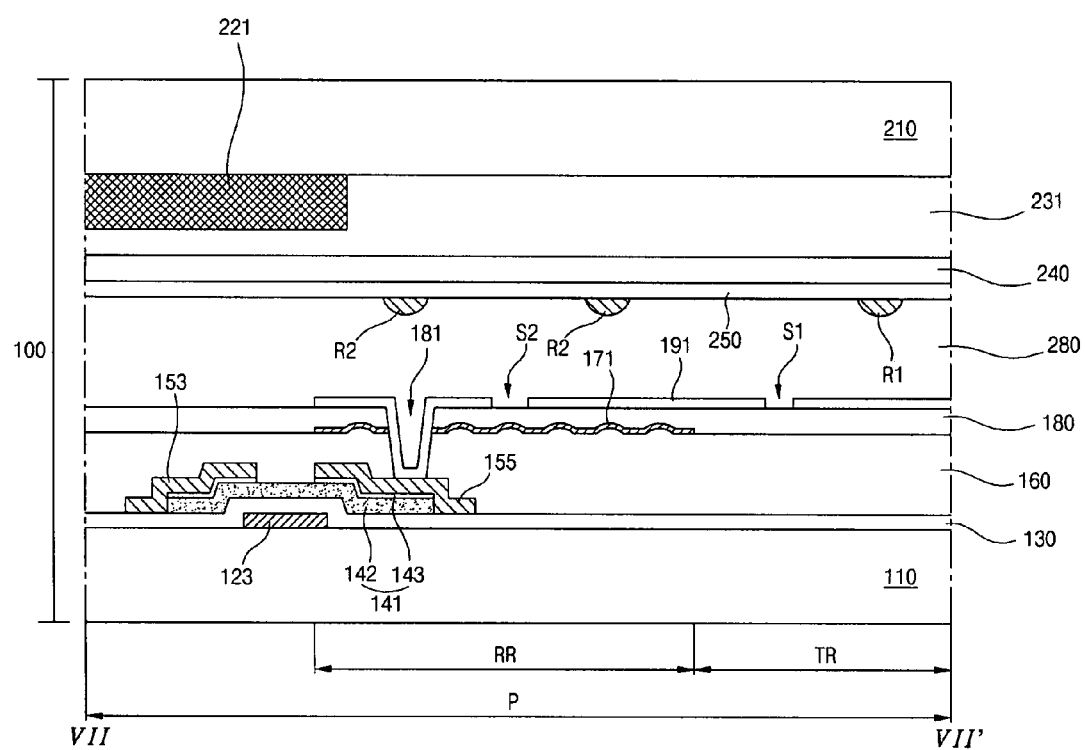
FIG. 7 is a cross-sectional view taken along line VII-VII' of FIG. 6.

FIG. 6 is a plan view of a VA mode transflective LCD device according to a second exemplary embodiment of the present invention, and FIG. 7 is a cross-sectional view taken along line VII-VII' of FIG. 6. The VA mode transflective LCD device shown in FIGS. 6 and 7 has substantially the same structure, except for forming a rib on the common electrode instead of using slits in the common electrode. The same parts as the first exemplary embodiment have the same references, and thus explanation for those parts in the second embodiment will be omitted.

As shown in FIGS. 6 and 7, the VA mode transflective LCD device has the single cell gap. In other words, the VA mode transflective LCD device has the same cell gap in the transmissive and reflective regions. The VA mode transflective LCD device includes the first and second substrates 110 and 210, and the liquid crystal layer 280 interposed therebetween. The liquid crystal layer 280 include the VA mode liquid crystal molecules. The VA mode liquid crystal molecules have an anisotropic dielectric constant of negative value.

The gate and data lines 121 and 151 are formed on the first substrate 110. The gate and data lines 121 and 151 cross each other to define the pixel region P. The pixel region P includes the transmissive and reflective regions TR and RR. The TFT T, which includes the gate electrode 123, the semiconductor layer 141 and the source and drain electrodes 153 and 155, is formed adjacent to where the gate and data lines 121 and 151 cross each other. The gate electrode 123 extends from the gate line 121, and the semiconductor layer 141 is formed on the gate electrode 123 with a gate insulating layer 130 interposed therebetween. The semiconductor layer 141 includes the active layer 142 and the ohmic contact layer 143. The source electrode 153 extends from the data line 151 and is separated from the drain electrode 155. The source and drain electrodes 153 and 155 are formed on the semiconductor layer 141.

The first passivation layer 160 is formed on the TFT T. A portion of the upper surface of the first passivation layer 160 has an uneven shape. The uneven shape is disposed in the reflective region RR. The reflective electrode 171 is formed on the first passivation layer 160 in the reflective region RR such that the reflective electrode 171 has the uneven shape. The second passivation layer 180 is formed on the reflective electrode 171. The first and second passivation layers 160 and 180 have a drain contact hole 181. The drain contact hole 181 exposes the drain electrode 155. The drain contact hole 181 is formed where the reflective electrode 171 is formed such that the drain contact hole 181 is also made through the reflective electrode 171. The transmissive electrode 191 is formed of the transparent conductive material on the second passivation layer 180 in the transmissive and reflective regions TR and RR. The transparent conductive material can include one of ITO and IZO. The transmissive electrode 191 is connected to the drain electrode 155 through the drain contact hole 181. The transmissive electrode 191 is connected to the reflective electrode 171.

The black matrix 221, the color filter layer 231, the planarization layer 240 and the common electrode 250 are sequentially formed on the second substrate 210. The black matrix 221 corresponds to the gate line 121, the data line 151 and the TFT T and has the openings corresponding to the pixel region P. The color filter layer 231 is formed on the black matrix 221 in the openings. As not shown, the color filter layer 231 includes one of red, green and blue colors. The planarization layer 240 is formed on the color filter layer 231. The common electrode 250 is formed on the planarization layer 240 to face the transmissive electrode 191. The common electrode 250 is formed of the transparent conductive material, including one of ITO and IZO. An electric field is induced between the transmissive electrode 191 and the common electrode 250.

The transmissive electrode 191 includes the first and second slits S1 and S2 in transmissive and reflective regions TR and RR, respectively. The electric field between the transmissive electrode 191 and the common electrode 250 is distorted by the first and second slits S1 and S2. The first and second slits S1 and S2 have a chevron shape. In other words, a center portion of the first to second slits S1 and S2 is bent. The first to second slits S1 and S2 can have more than two bent portions. The first and second slits S1 and S2 have different chevron shapes. In other words, the bent portions of the first and second slits S1 and S2 have different angles. The bent portion of the first slit S1 has a first angle $\theta 1$ greater than a second angle $\theta 2$ of the bent portion of the second slit S2.

The first and second angles $\theta 1$ and $\theta 2$ are defined with respect to a vertical direction to a symmetrical axis SA of the first and second slits S1 to S2. The first angle $\theta 1$ can be between 30 degrees and 60 degrees, and the second angle $\theta 2$ can be between 10 degrees and 30 degrees. The first angle θ1 can be 45 degrees, and the second angle θ2 can be 22.5 degrees. In other words, the first angle θ1 can be twice as much as the second angle θ2.

First and second ribs R1 and R2 are formed on the common electrode 250. The first and second ribs R1 and R2 are formed in the transmissive and reflective regions TR and RR, respectively. The first and second ribs R1 and R2 correspond to the first and second slits S1 and S2 of the transmissive electrode 191, respectively. The first rib R1 is alternately arranged with the first slit S1, and the second rib R2 is alternately arranged with the second slit S2. The electric field between the transmissive and common electrodes 191 and 250 is also distorted by the first and second ribs R1 and R2.

The first and second ribs R1 and R2 have the chevron shape. In other words, a center portion of the first and second ribs R1 and R2 is bent. The first to second ribs R1 and R2 can have more than two bent portions. The first and second ribs R1 and R2 have different chevron shapes. In other words, the bent portions of the first and second ribs R1 and R2 have different angles. The bent portion of the first rib R1 has a third angle θ3 greater than a fourth angle θ4 of the bent portion of the second rib R2. The third and fourth angles θ3 and θ4 are defined with respect to a vertical direction to a symmetrical axis SA of the first and second ribs R1 and R2. The third angle θ3 can be between 30 degrees and 60 degrees, and the fourth angle θ4 can be between 10 degrees and 30 degrees. The third angle θ3 can be 45 degrees, and the fourth angle θ4 can be 22.5 degrees. In other words, the third angle θ3 can be twice as much as the fourth angle θ4. The first and third angles θ1 and θ3 can have the same value, and the second and fourth angles θ2 to θ4 can have the same value. The first and second slits and the first and second ribs have the chevron shape, as shown in FIGS. 6 and 7. Alternatively, the first and second slits and the first and second ribs can have a linear bar shape.

The electric fields in the transmissive and reflective regions TR and RR varies depending on shapes of the first and second slits S1 and S2 and the first and second ribs. In embodiments of the present invention, the VA mode liquid crystal molecules are used for the liquid crystal layer 280. As a result, the major axis of the liquid crystal molecules are arranged to be perpendicular to the first and second substrates 110 and 210 without the electric field between the transmissive and common electrodes 191 and 250. On the other hand, the major axis of the liquid crystal molecules are arranged to be perpendicular to the electric field between the transmissive and common electrodes 191 and 250.

As shown in FIGS. 6 and 7, the slits are formed in the transmissive electrode, and the ribs are formed on the common electrode. Alternatively, ribs instead of slits can also be formed on the transmissive electrode.

Figure 8:
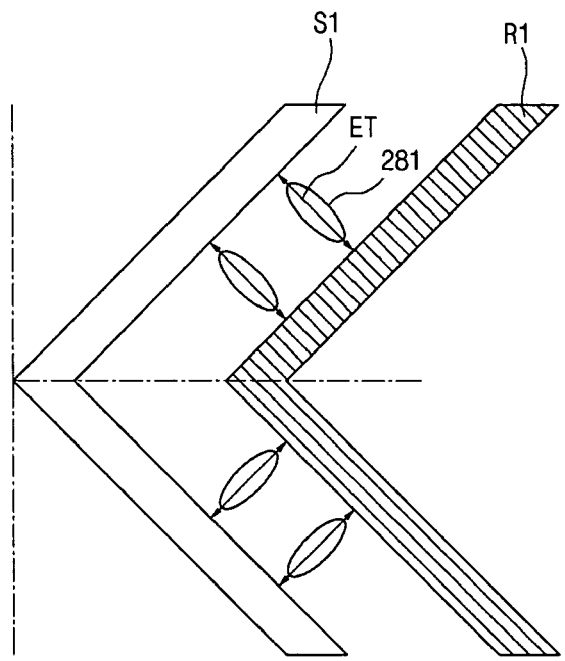
FIG. 8 is a schematic plan view showing an electric field and an arrangement of liquid crystal molecules in a transmissive region of a VA mode transflective LCD device shown in FIG. 6.
Figure 9:
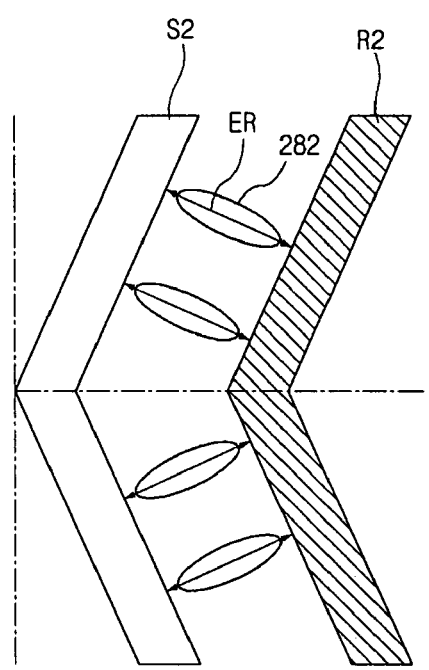
FIG. 9 is a schematic plane view showing an electric field and an arrangement of liquid crystal molecules in a reflective region of a VA mode transflective LCD device shown in FIG. 6.

FIG. 8 is a schematic plan view showing an electric field and an arrangement of liquid crystal molecules in a transmissive region of a VA mode transflective LCD device shown in FIG. 6, and FIG. 9 is a schematic plan view showing an electric field and an arrangement of liquid crystal molecules in a reflective region of a VA mode transflective LCD device shown in FIG. 6.

As shown in FIG. 8, in a plan view of the transmissive region TR (of FIG. 7), the electric field ET between the transmissive and common electrodes 191 and 250 (of FIG. 7) is inclined to the symmetrical axis SA of the first slit S1 and the first rib S1 depending on the first and third angles θ1 and θ3. Summation of the angle of the electric field ET to the symmetrical axis SA and one of the first and third angles θ1 and θ3 can be 90 degrees. Moreover, although not shown, the electric field is inclined with respect to a vertical line to the substrates. The major axis of liquid crystal molecules 281 is perpendicular to the electric field ET. The angle of the major axis of the liquid crystal molecules 281 with respect to the symmetrical axis SA can be same as one of the first and third angles θ1 and θ3. In two portions defined by the symmetrical axis SA, the arrangements of the liquid crystal molecules 281 are symmetric to each other.

As shown in FIG. 9, in a plan view of the reflective region RR (of FIG. 3), the electric field ER between the transmissive and common electrodes 191 and 250 (of FIG. 3) is inclined to the symmetrical axis SA of the second slit S2 and the second rib R2 depending on the second and fourth angles θ2 and θ4. Summation of the angle of the electric field ER to the symmetrical axis SA and one of the second and fourth angles θ2 and θ4 can be 90 degrees. Moreover, although not shown, the electric field is inclined with respect to a vertical line to the substrates. The major axis of liquid crystal molecules 282 is perpendicular to the electric field ER. The angle of the major axis of the liquid crystal molecules 282 with respect to the symmetrical axis SA can be same as one of the second and fourth angles θ2 and θ4. In two portions defined by the symmetrical axis SA, the arrangements of the liquid crystal molecules 282 are symmetric to each other.

As shown in FIGS. 8 and 9, the liquid crystal molecules 281 and 282 in the transmissive and reflective regions TR and RR are arranged with different angles. As a result, when the same voltage is applied to the transmissive and common electrodes 191 and 250, the liquid crystal molecules 281 and 282 in the transmissive and reflective regions TR and RR have different effective phase difference values. For example, when the first angle θ1 is different from the second angle θ2, the phase difference value of the liquid crystal molecules 281 is the same as the phase difference value of the liquid crystal molecules 282, and but the light passed through the liquid crystal layer in the transmissive and reflective regions is differently polarized. Accordingly, even if the cell gap in the transmissive and reflective regions TR and RR is same, the V-T characteristic in the transmissive region TR and the V-R characteristic in the reflective region RR can be controlled to have substantially the same curve in each of the regions such that the display brightness problems of the related art can be resolved. The VA mode transflective LCD device having a single cell gap is able to display excellent images without dual gamma method. Since there is no necessary of driving circuits for the dual gamma method, production cost is reduced. Moreover, the VA mode transflective LCD device with the single cell gap has improved production yield.

With regard to FIGS. 6 and 7, a method of fabricating the VA mode transflective LCD device according to the second exemplary embodiment of the present invention is explained. An array substrate of the VA mode transflective LCD device is manufactured by a process as following.

First, the gate line 121 and gate electrode 123 are formed on the first substrate 110 by depositing and patterning a first metal material. The gate electrode 123 extends from the gate line 121. Then, the gate insulating layer 130 is formed on the gate line 121 and gate electrode 123.

Next, the active layer 142 and the ohmic contact layer 143 are formed on the gate insulating layer 130 by sequentially depositing and patterning pure amorphous silicon (a:Si—H) and impurity-doped amorphous silicon (n+ or p+ a-Si:H). The active layer 142 and the ohmic contact layer 143 constitute the semiconductor layer 141.

Next, the data line 151 and the source and drain electrodes 153 and 155 are formed on the semiconductor layer 141 by depositing and patterning a second metal material. The source electrode 153 extends from the data line 151 and is separated from the drain electrode 155.

Next, the passivation layer 160 having the uneven upper shape is formed on the data line 151 and the source and drain electrodes 153 and 155. The uneven shape is disposed in the reflective region RR.

Next, the reflective electrode 171 is formed on the first passivation layer 160 in the reflective region RR by deposing and patterning a third metal material. The third metal material has excellent reflectance.

Next, the second passivation layer 180 is formed on the reflective electrode 171. The first and second passivation layers 160 and 180 are patterned to form the drain contact hole 181 exposing the drain electrode 155.

Next, the transmissive electrode 191 having the first and second slits S1 and S2 is formed on the second passivation layer 180 by depositing and patterning the transparent conductive material. The transmissive electrode 191 is connected to the drain electrode 155 through the drain contact hole 181. The transmissive electrode 191 can be connected to the reflective electrode 171 through the drain contact hole 181. The first and second slits S1 and S2 are formed in the transmissive and reflective regions TR and RR.

A color filter substrate of the VA mode transflective LCD device is manufactured as follows. First, the black matrix 221 is formed on the second substrate 210 by depositing and patterning one of black resin and chromium. The black matrix 221 corresponds to the gate line 121, the data line 151 and the TFT T. Further, the black matrix 221 includes openings corresponding to the pixel region P.

Next, the color filter layer 231 is formed on the black matrix in the openings by depositing and patterning color resin. The color filter layer 231 has one of red, green and blue colors.

Next, the planarization layer 240 is formed on the black matrix 221 and the color filter layer 231. The planarization layer 240 has a flat upper surface.

Next, the common electrode 250 having the first and second ribs R1 and R2 is formed on the planarization layer 240 by depositing and patterning the transparent conductive material, such as ITO and IZO. The first and second ribs R1 and R2 are disposed in the transmissive and reflective regions TR and RR, respectively. The first rib R1 is alternately arranged with the first slit S1 of the transmissive electrode 191, and the second rib R2 is alternately arranged with the second slit S2 of the transmissive electrode 191.

The array substrate and the color filter substrate are attached by using a seal pattern to form a space between the array substrate and color filter substrate. Then, the VA mode transflective LCD device is manufactured by forming the VA mode liquid crystal layer in the space.

Figure 10:
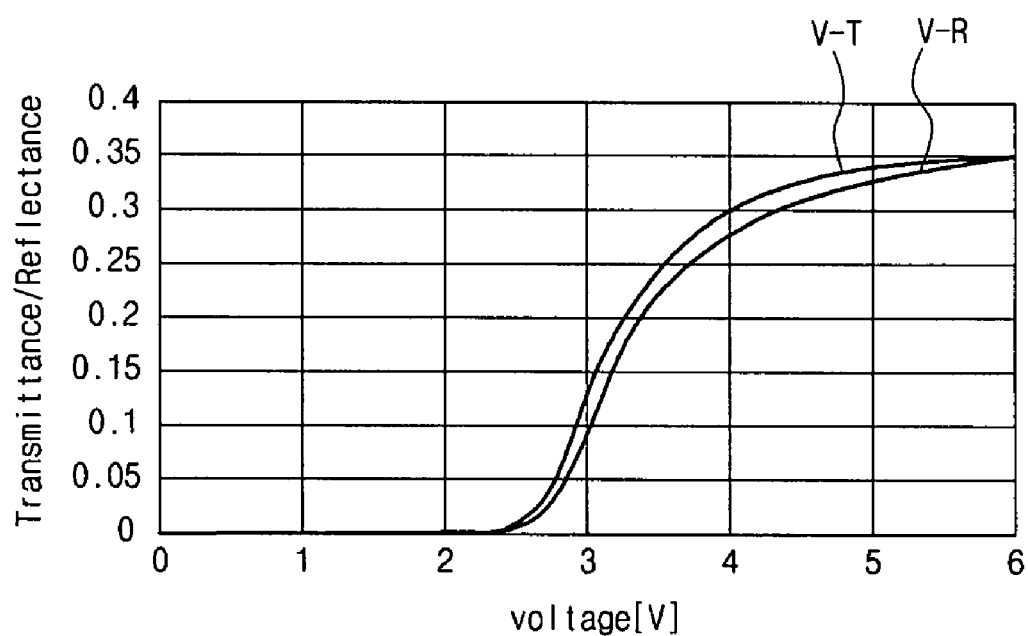
FIG. 10 is a graph showing a V-T characteristic and a V-R characteristic of a VA mode transflective LCD device according to the present invention.

FIG. 10 is a graph showing a V-T characteristic and a V-R characteristic of a VA mode transflective LCD device according to embodiments of the present invention. As shown in FIG. 10, the V-T characteristic in the transmissive region and the V-R characteristic in the reflective region have substantially the same curve. The similar V-T characteristic and V-R characteristic curves are caused by electric field distorting units, such as first to fourth slits S1 to S4 (of FIG. 3), or such as the first and second slits S1 and S2 (of FIG. 8) and the first and second ribs R1 and R2 (of FIG. 8). Since the V-T characteristic in the transmissive region and the V-R characteristic in the reflective region have substantially the same curve without dual cell gap, the VA mode transflective LCD device according embodiments of the present invention can be driven by single gamma method, rather than a dual gamma method. As a result, production yield of the VA mode transflective LCD device according to the present invention is increased with the single cell gap. Moreover, since additional driving circuits of the dual gamma method are not needed, production cost is decreased.

To compensate for the phase difference value of the liquid crystal molecules in the reflective region, a retardation film can be further included. Another exemplary embodiment including the retardation film will be discussed with regard to FIG. 11.

Figure 11:
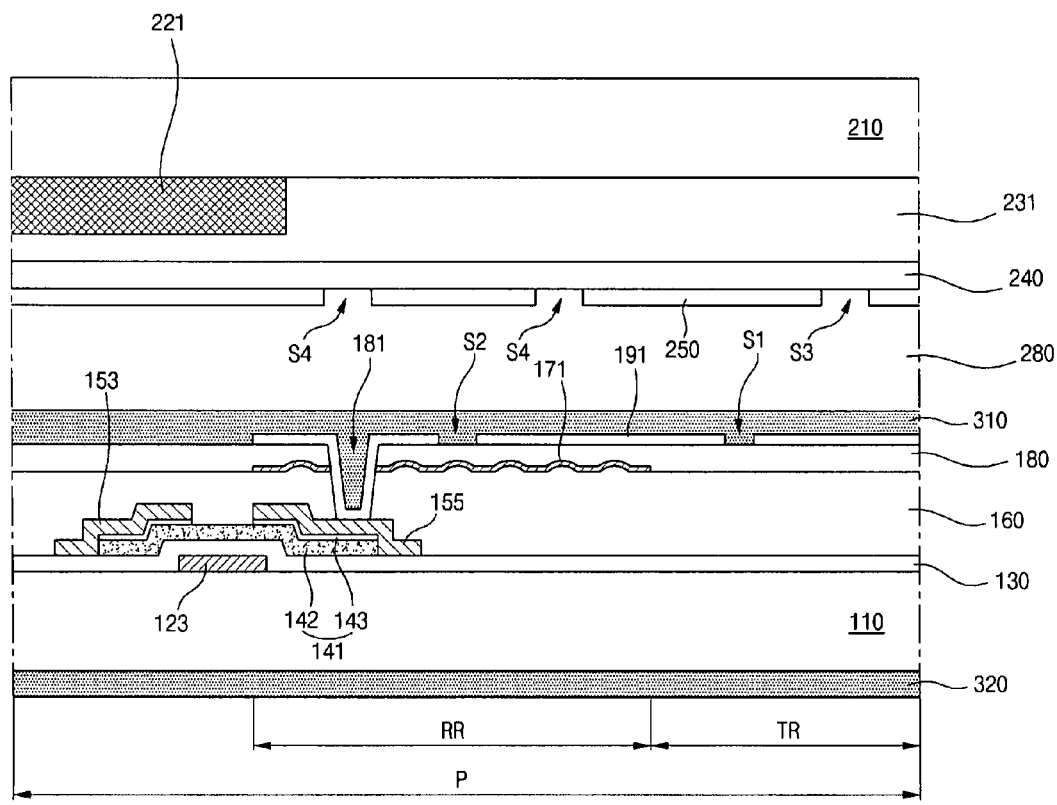
FIG. 11 is a plan view of a VA mode transflective LCD device according to a third exemplary embodiment of the present invention.

FIG. 11 is a plan view of a VA mode transflective LCD device according to a third exemplary embodiment of the present invention. The VA mode transflective LCD device according to the third exemplary embodiment has the same structure and the same manufacturing method as the first exemplary embodiment, except for a retardation film in the reflective region RR and in the transmissive region TR. The same parts as the first exemplary embodiment have the same references, and thus explanation for those parts in the third embodiment will be omitted.

As shown in FIG. 11, the VA mode transflective LCD device has a single cell gap, wherein a cell gap in the transmissive region TR is substantially the same as a cell gap in the reflective region RR. A first retardation film 310 is formed on an inner surface of the first substrate 110 adjacent to the liquid crystal layer 280, that is, on the transmissive electrode 191. A second retardation film 320 is formed on an outer surface of the first substrate 110. Although not shown in FIG. 11, a first polarizer is disposed on an outer surface of the second retardation film 320, and a second polarizer is disposed on an outer surface of the second substrate 210.

The VA mode liquid crystal molecules, which have an anisotropic dielectric constant of negative value, are used for the liquid crystal layer 280. As a result, the major axis of the liquid crystal molecules are arranged perpendicularly to the first and second substrates 110 and 210 when a voltage is not applied to the transmissive and common electrodes 191 and 250. On the other hand, when a voltage is applied to the transmissive and common electrodes 191 and 250, the major axis of the liquid crystal molecules are arranged perpendicularly to an electric field induced between the transmissive and common electrodes 191 and 250, i.e., parallel to the first and second substrates 110 and 210. When the voltage is not applied, the liquid crystal layer 280 has a phase difference value of zero, and when the voltage is applied, the liquid crystal layer has the phase difference value of $\lambda/2$. The first and second retardation films 310 and 320, which can be referred to as QWPs (quarter wave plates), have a phase difference value of $\lambda/4$.

As stated in the first exemplary embodiment, the bent portions of the first and third slits S1 and S3 in the transmissive region TR have a different angle than the bent portions of the second and fourth slits S2 and S4 in the reflective region RR. The angles of the bent portions of the first to fourth slits S1, S2, S3 and S4 are defined with respect to a vertical direction to a symmetrical axis of the first to fourth slits S1 to S4. The vertical direction is parallel to the data line, and the symmetrical axis is parallel to the gate line. The vertical direction and the symmetrical axis can change. For example, the bent portions of the first and third slits S1 and S3 can have the angle of 45 degrees with respect to the vertical direction, and the bent portions of the second and fourth slits S2 and S4 can have the angle of 22.5 degrees with respect to the vertical direction. Here, the ribs of the second exemplary embodiment can be used in place of the third and fourth slits S3 and S4 in order to distort an electric field.

Accordingly, when a voltage is applied and an electric field is induced between the transmissive electrode 191 and the common electrode 250, the liquid crystal molecules of the liquid crystal layer 280 in the transmissive region TR are arranged with an angle of 45 degrees with respect to the vertical direction, and the liquid crystal molecules in the reflective region RR are arranged with an angle of 22.5 degrees with respect to the vertical direction.

The first and second polarizers are arranged such that optical axes are parallel to each other. The optical axes of the first and second polarizers are perpendicular to the vertical direction, that is, parallel to the gate line.

The VA mode transflective LCD device can have a normally black mode, in which light is not emitted when the voltage is not applied, and light is emitted when the voltage is applied.

Figure 12A:
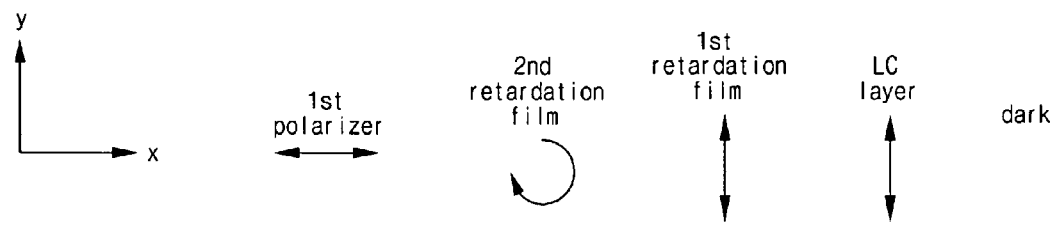
FIGS. 12A and 12B are views illustrating polarizations of light in a transmissive region in the LCD device of FIG. 11 before and after an electric field is induced, respectively.
Figure 12B:
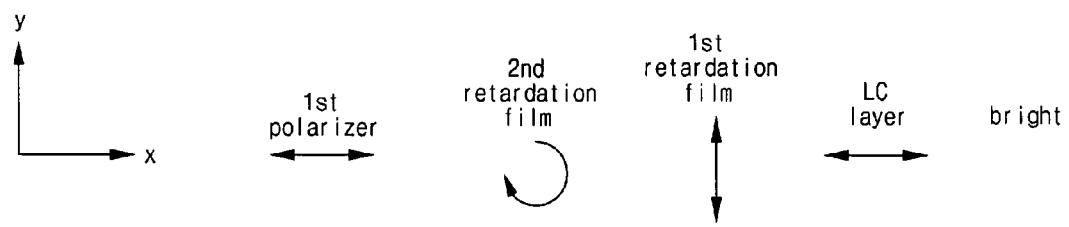
Figure 13A:
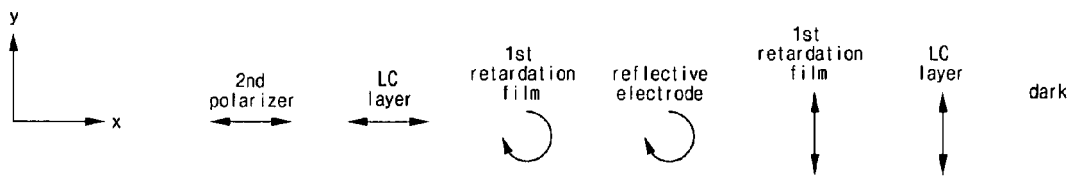
FIGS. 13A and 13B are views illustrating polarizations of light in a reflective region in the LCD device of FIG. 11 before and after an electric field is induced, respectively.
Figure 13B:
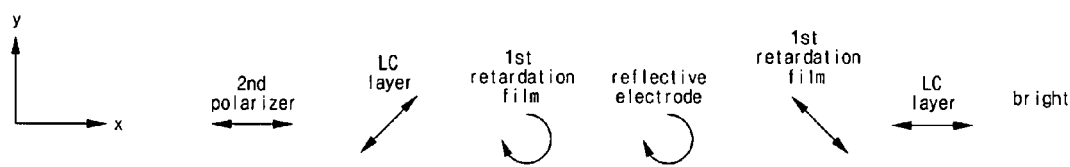

Polarizations of light passing through the VA mode transflective LCD device are shown in FIGS. 12A and 12B and FIGS. 13A and 13B. FIGS. 12A and 12B are views illustrating polarizations of light in a transmissive region in the LCD device of FIG. 11 before and after an electric field is induced, respectively. FIGS. 13A and 13B are views illustrating polarizations of light in a reflective region in the LCD device of FIG. 11 before and after the electric field is induced, respectively. Each polarization is described with respect to an x-axis in an x-y coordinate system. The x-axis is parallel to the gate line (not shown), and a y-axis is parallel to the data line (not shown). Therefore, the vertical direction to the symmetrical axis of the first to fourth slits S1 to S4 of FIG. 11 is perpendicular to the x-axis, and the optical axes of the first and second polarizers are parallel to the x-axis. In addition, when the electric field is induced, the liquid crystal molecules in the transmissive region TR are arranged such that the major axis of the liquid crystal molecules has an angle of 45 degrees with respect to the x-axis, and the liquid crystal molecules in the reflective region RR are arranged such that the major axis of the liquid crystal molecules has an angle of 22.5 degrees with respect to the x-axis. Optical axes of the first and second retardation films 310 and 320 of FIG. 11 have an angle of 45 degrees with respect to the x-axis.

Figure 1:
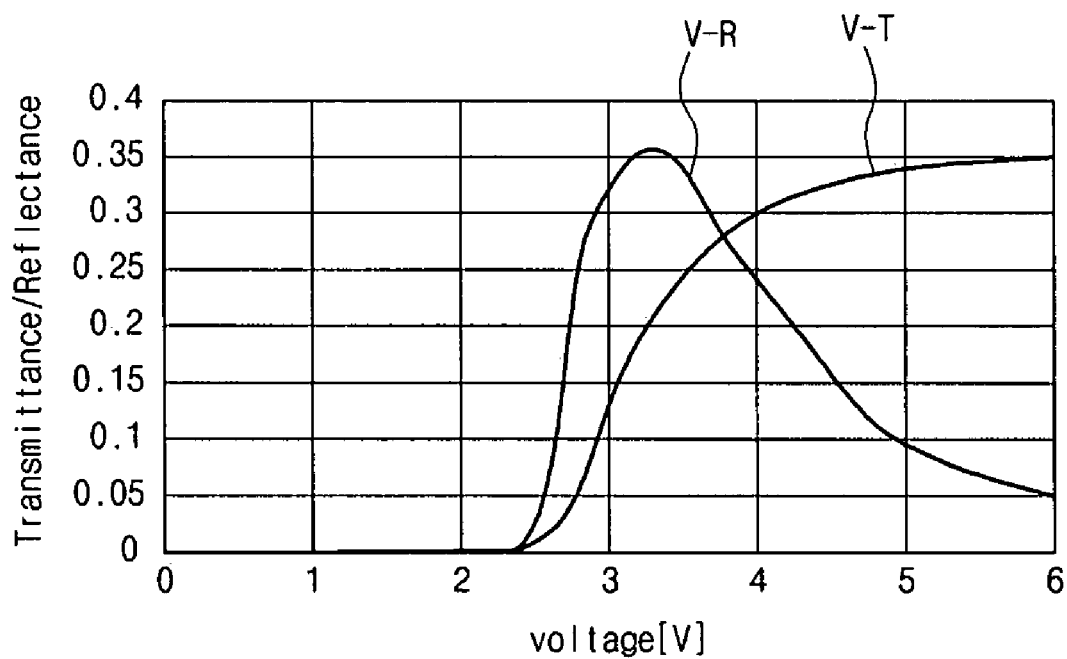
FIG. 1 is a graph showing a V-T characteristic and a V-R characteristic of a VA mode transflective LCD device having a single cell gap type according to the related art.

As shown in FIG. 12A, in the transmissive region TR of FIG. 11 when a voltage is not applied and an electric field is not induced, an incident light from a backlight (not shown) is changed to a linearly polarized light, which is parallel to the x-axis, after passing through the first polarizer (not shown). The linearly polarized light is changed to a right-circularly polarized light after passing through the second retardation film 320 of FIG. 1. The right-circularly polarized light is changed to a linearly polarized light, which is perpendicular to the x-axis, after passing through the first retardation film 310 of FIG. 1. Then, the linearly polarized light passes through the liquid crystal layer 280 of FIG. 11 and reaches the second polarizer (not shown) without changing a phase because the liquid crystal layer 280 has a phase difference value of zero. While the optical axis of the second polarizer is parallel to the x-axis, the linearly polarized light reaching the second polarizer is perpendicular to the x-axis and is not transmitted through the second polarizer. Thus, a dark image is displayed.

As shown in FIG. 12B, in the transmissive region TR of FIG. 11 when a voltage is applied and an electric field is induced, an incident light from a backlight is changed to a linearly polarized light, which is parallel to the x-axis, after passing through the first polarizer. The linearly polarized light is changed to a right-circularly polarized light after passing through the second retardation film 320 of FIG. 11. The right-circularly polarized light is changed to a linearly polarized light, which is perpendicular to the x-axis, after passing through the first retardation film 310 of FIG. 1. Then, the linearly polarized light passes through the liquid crystal layer 280 of FIG. 11. Since the liquid crystal layer 280 has a phase difference value of $\lambda/2$ and the major axis of the liquid crystal molecules has an angle of 45 degrees with respect to the x-axis, the linearly polarized light perpendicular to the x-axis is changed to a linearly polarized light parallel to the x-axis and then reaches the second polarizer. The linearly polarized light reaching the second polarizer is parallel to the optical axis of the second polarizer and is transmitted through the second polarizer. Thus, a bright image is displayed.

Meanwhile, as shown in FIG. 13A, in the reflective region RR of FIG. 11 when the voltage is not applied and the electric field is not induced, an incident light from the outside is changed to a linearly polarized light, which is parallel to the x-axis, after passing through the second polarizer. The linearly polarized light passes through the liquid crystal layer 280 of FIG. 11 without changing a phase because the liquid crystal layer 280 has a phase difference value of zero. Then, the linearly polarized light is changed to a right-circularly polarized light after passing through the first retardation film 310 of FIG. 11. The right-circularly polarized light is reflected on the reflective electrode 171 of FIG. 11. The reflected right-circularly polarized light is changed to a linearly polarized light perpendicular to the x-axis after passing through the first retardation film 310 of FIG. 11 again. Next, the linearly polarized light passes through the liquid crystal layer 280 of FIG. 11 again without changing a phase and reaches the second polarizer. While the optical axis of the second polarizer is parallel to the x-axis, the linearly polarized light reaching the second polarizer is perpendicular to the x-axis and is not transmitted through the second polarizer. Thus, a dark image is displayed.

As shown in FIG. 13B, in the reflective region RR of FIG. 11 when the voltage is applied and the electric field is induced, an incident light from the outside is changed to a linearly polarized light, which is parallel to the x-axis, after passing through the second polarizer. The linearly polarized light passes through the liquid crystal layer 280 of FIG. 11. The major axis of liquid crystal molecules of the liquid crystal layer 280 has an angle of 22.5 degrees with respect to the x-axis, the liquid crystal layer 280 has a phase difference value of $\lambda/2$. Accordingly, the linearly polarized light parallel to the x-axis is changed to a linearly polarized light having a predetermined angle with respect to the x-axis, such as an angle of 45 degrees. Then, the linearly polarized light is changed to a right-circularly polarized light after passing through the first retardation film 310 of FIG. 11. The right-circularly polarized light is reflected on the reflective electrode 171 of FIG. 11. The reflected right-circularly polarized light is changed to a linearly polarized light having an angle of 135 degrees with respect to the x-axis after passing through the first retardation film 310 again. Next, the linearly polarized light passes through the liquid crystal layer 280 again and is changed to a linearly polarized light parallel to the x-axis. The linearly polarized light parallel to the x-axis reaches the second polarizer. The linearly polarized light reaching the second polarizer is parallel to the optical axis of the second polarizer and is transmitted through the second polarizer. Thus, a bright image is displayed.

In the third exemplary embodiment, the retardation films are disposed both in the transmissive region and in the reflective region, and a retardation film can be formed only in the reflective region. By compensating the phase difference value of the liquid crystal layer in the reflective region using the first and second retardation films, equal display modes are obtained in the transmissive and reflective regions. A fourth exemplary embodiment including the retardation film in the reflective region will be described with reference to FIG. 14.

Figure 14:
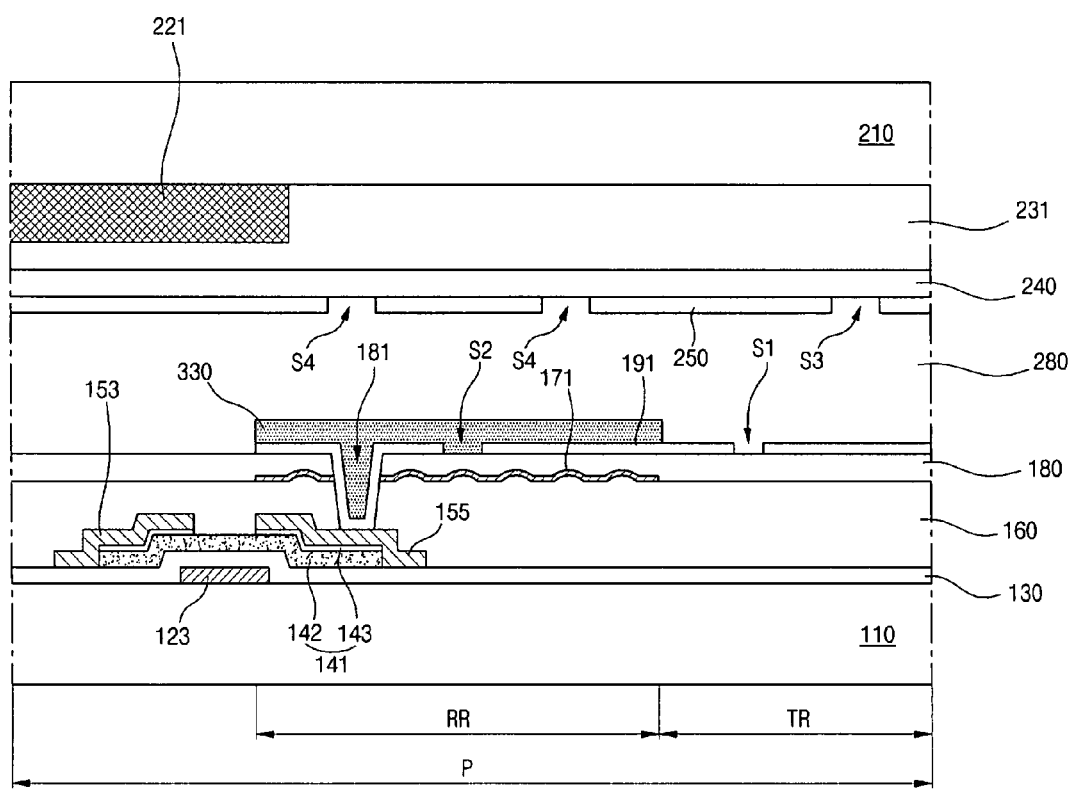
FIG. 14 is a plan view of a VA mode transflective LCD device according to a fourth exemplary embodiment of the present invention.

FIG. 14 is a plan view of a VA mode transflective LCD device according to a fourth exemplary embodiment of the present invention. The VA mode transflective LCD device according to the fourth exemplary embodiment has the same structure and the same manufacturing method as the third exemplary embodiment, except for the use of a retardation film in the reflective region RR. The same parts as the third exemplary embodiment have the same references, and thus explanation for those parts will be omitted.

As shown in FIG. 14, the VA mode transflective LCD device has a single cell gap, wherein a cell gap in the transmissive region TR is substantially the same as a cell gap in the reflective region RR. A retardation film 330 is formed on an inner surface of the first substrate 110 adjacent to the liquid crystal layer 280, that is, on the transmissive electrode 191. The retardation film 330 is disposed only in the reflective region RR.

Although not shown in the figure, a first polarizer is disposed on an outer surface of the first substrate 110, and a second polarizer is disposed on an outer surface of the second substrate 210. Here, optical axes of the first and second polarizers have different directions.

The VA mode liquid crystal molecules, which have an anisotropic dielectric constant of negative value, are used for the liquid crystal layer 280. As a result, the major axis of the liquid crystal molecules are arranged perpendicularly to the first and second substrates 110 and 210 when a voltage is not applied to the transmissive and common electrodes 191 and 250. In other hands, when a voltage is applied to the transmissive and common electrodes 191 and 250, the major axis of the liquid crystal molecules are arranged perpendicularly to an electric field induced between the transmissive and common electrodes 191 and 250, i.e., parallel to the first and second substrates 110 and 210. When the voltage is not applied, the liquid crystal layer 280 has the phase difference value of zero, and when the voltage is applied, the liquid crystal layer has the phase difference value of $\lambda/2$. The retardation film 330 has a phase difference value of $\lambda/4$, which can be referred to as a QWP (quarter wave plate).

As stated in the first exemplary embodiment, the bent portions of the first and third slits S1 and S3 in the transmissive region TR have a different angle from the bent portions of the second and fourth slits S2 and S4 in the reflective region RR. The angles of the bent portions of the first to fourth slits S1, S2, S3 and S4 are defined with respect to a vertical direction to a symmetrical axis of the first to fourth slits S1 to S4. For example, the bent portions of the first and third slits S1 and S3 can have the angle of 45 degrees with respect to the vertical direction, and the bent portions of the second and fourth slits S2 and S4 can have the angle of 22.5 degrees with respect to the vertical direction. Here, the vertical direction is parallel to the data line, and the symmetrical axis is parallel to the gate line. Therefore, the first and third slits S1 and S3 have an angle of 45 degrees with respect to the data line, and the second and fourth slits S2 and S4 have an angle of 22.5 degrees with respect to the data line.

Accordingly, when a voltage is applied, the liquid crystal molecules in the transmissive region TR are arranged such that the major axis has an angle of 45 degrees with respect to the gate line, and the liquid crystal molecules in the reflective region RR are arranged such that the major axis has an angel of 22.5 degrees with respect to the gate line. Here, an optical axis of the retardation film 330 has an angle of 45 degrees with respect to the gate line, an optical axis of the first polarizer has an angle of 45 degrees with respect to the gate line, and an optical axis of the second polarizer is parallel to the gate line.

To compensate the phase difference value of the liquid crystal layer, the retardation film can be formed only in the reflective region. More specifically, the retardation film can be formed using a curable liquid crystal material, which is cured by light or heat. That is, an alignment layer is formed on a substrate, and the alignment layer is coated with the curable liquid crystal material dissolved in solvent. Next, the solvent is evaporated by heating the substrate including the coated liquid crystal material, and the coated liquid crystal material is cured by irradiating ultraviolet (UV) lays to thereby form the retardation film.

At this time, to form the retardation film 330 only in the reflective region RR, the coated liquid crystal material is partially cured by irradiating UV rays, and the uncured liquid crystal material can be removed. More particularly, a liquid crystal layer is formed by coating the first substrate 110 with the curable liquid crystal material dissolved in solvent. The UV rays are irradiated on the liquid crystal layer through a mask (not shown). The mask includes a light-transmitting portion and a light-blocking portion. The light-transmitting portion corresponds to the reflective region RR, and the light-blocking portion corresponds to the region excluding the reflective region RR. Accordingly, a part of the liquid crystal layer exposed to the UV rays is cured, and a part of the liquid crystal layer not exposed to the UV rays is not cured. Next, the uncured part of the liquid crystal layer is removed, and the solvent is evaporated by heating the cured part of the liquid crystal layer, thereby forming the retardation film 330 only in the reflective region RR.

Since the retardation film 330 is formed only in the reflective region RR, as shown in FIG. 14, a step exists between the reflective region RR and the transmissive region TR due to a thickness of the retardation film 330. This step can cause problems when an alignment layer is formed on the retardation film 330 to initially align the liquid crystal molecules of the liquid crystal layer 280. In addition, as the retardation film 330 gets thick, there can be difference in cell gaps between the reflective region RR and the transmissive region TR. That is, thicknesses of the liquid crystal layer 280 are not equal in the reflective region RR and in the transmissive region TR. To prevent these problems, it is possible that a portional retardation film is formed both in the reflective region and in the transmissive region and only a portion of the retardation film in the reflective region has a phase difference value.

Figure 15:
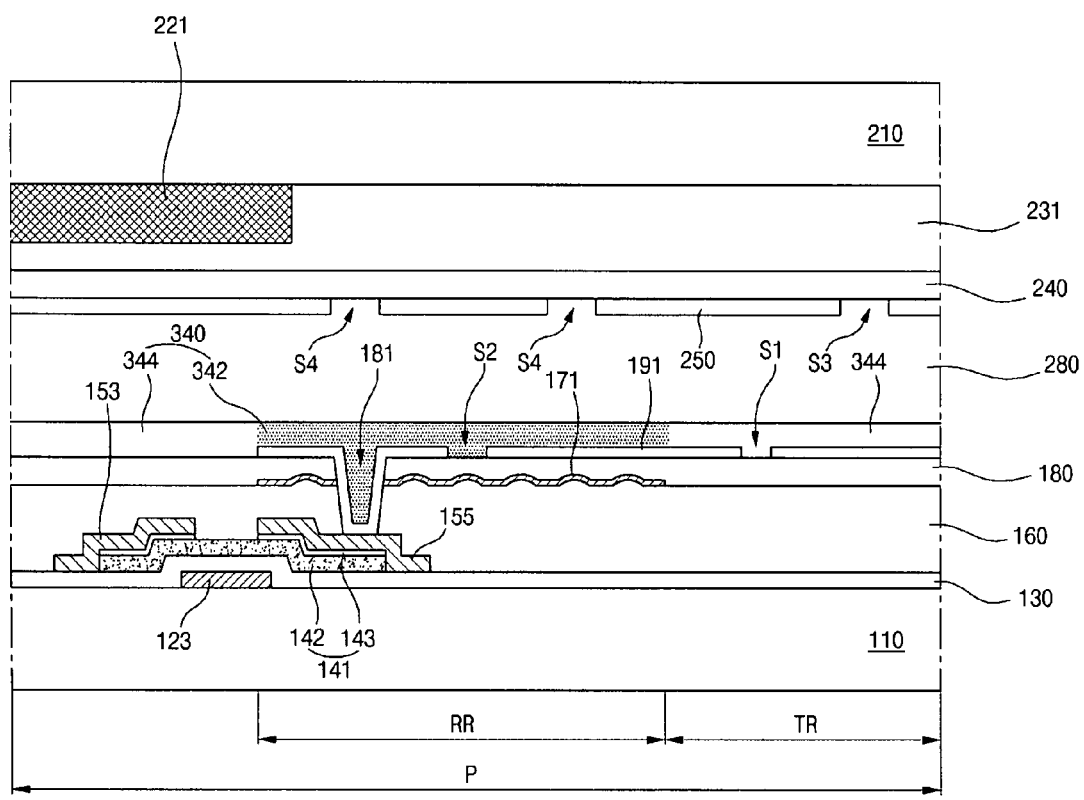
FIG. 15 is a plan view of a VA mode transflective LCD device according to a fifth exemplary embodiment of the present invention.

FIG. 15 is a plan view of a VA mode transflective LCD device according to a fifth exemplary embodiment of the present invention. The VA mode transflective LCD device according to the fifth exemplary embodiment has the same structure and the same manufacturing method as the fourth exemplary embodiment except for the portional retardation film. The same parts as the fourth exemplary embodiment have the same references, and thus explanation for those parts will be omitted.

As shown in FIG. 15, the VA mode transflective LCD device has a single cell gap, wherein a cell gap in the transmissive region TR is substantially the same as a cell gap in the reflective region RR. A portional retardation film 340 is formed on an inner surface of the first substrate 10 adjacent to the liquid crystal layer 280, that is, on the transmissive electrode 191. The portional retardation film 340 is disposed substantially over an entire surface of the first substrate 110 including the reflective region RR and the transmissive region TR. The portional retardation film 340 includes a first portion 342 having a phase difference value greater than zero in the reflective region RR and a second portion 344 having a phase difference value of zero in the transmissive region TR. The first portion 342 has a phase difference value of λ/4, and the second portion 344 has a phase difference value of zero.

The portional retardation film 340 can be formed by first curing the first portion 342 in the reflective region RR using UV rays, making the second portion 344 have an isotropic property, and then heating the portional retardation film 340 to second curing the first and second portions 342 and 344.

More particularly, a liquid crystal layer is formed by coating the first substrate 110 with a curable liquid crystal material dissolved in solvent, and the liquid crystal layer is first cured by irradiating UV rays through a mask (not shown). The mask includes a light-transmitting portion and a light-blocking portion. The light-transmitting portion corresponds to the reflective region RR, and the light-blocking portion corresponds to the region excluding the reflective region RR. Accordingly, a part of the liquid crystal layer exposed to the UV rays, i.e., the part of the liquid crystal layer corresponding to the first portion 342, is cured, and a part of the liquid crystal layer not exposed to the UV rays, i.e., the part of the liquid crystal layer corresponding to the second portion 344, is not cured. Next, the solvent is evaporated by heating the liquid crystal layer, and the part of the liquid crystal layer corresponding to the second portion 344 has an isotropic property. The liquid crystal layer is second cured by irradiating UV rays or heating, thereby forming the retardation film 340, only the first part of which has a phase difference value of λ/4.

With the first and second exemplary embodiments of the present invention, the slits and ribs are used as the electric field distorting unit. However, other elements can be used as the electric field distorting unit. Moreover, to compensate the effective phase difference value of the liquid crystal layer in the reflective region, the retardation film is further formed between two substrates. The VA mode transflective LCD device can use one of RGB type, RGBW type and so on types of color filtering schemes to display color images.

It will be apparent to those skilled in the art that various modifications and variations can be made in the organic electroluminescent device and fabricating method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates facing each other and including transmissive and reflective regions;
   a first electric field distorting unit disposed in the transmissive region on one of the first and second substrates and having a first bent shape;
   a second electric field distorting unit disposed in the reflective region on one of the first and second substrates and having a second bent shape; and
   a liquid crystal layer interposed between the first and second substrates,
   wherein the first bent shape has a first angle with respect to a first vertical direction of a first symmetrical axis of the first bent shape and the second bent shape has a second angle with respect to a second vertical direction of a second symmetrical axis of the second bent shape, and the first angle is different from the second angle.

2. The liquid crystal display device according to claim 1, further comprising:
   a third electric field distorting unit disposed in the transmissive region on an other one of the first and second substrates and having a third bent shape; and
   a fourth electric field distorting unit disposed in the reflective region on other one of the first and second substrates and having a fourth bent shape, wherein the first and third electric field distorting units are offset from each other, and the second and fourth electric field distorting units are offset from each other.

3. The liquid crystal display device according to claim 2, wherein the third bent shape has a third angle with respect to a third vertical direction of a third symmetrical axis of the third bent shape and the fourth bent shape has a fourth angle with respect to a fourth vertical direction of a fourth symmetrical axis of the fourth bent shape, and the first angle is same as the third angle and the second angle is same as the fourth angle.

4. The liquid crystal display device according to claim 1, wherein the first electric field distorting unit is a slit in a pixel electrode.

5. The liquid crystal display device according to claim 1, wherein the second electric field distorting unit is a slit in a common electrode.

6. The liquid crystal display device according to claim 1, wherein the second electric field distorting unit is a rib on a common electrode.

7. The liquid crystal display device according to claim 1, further comprising a first retardation film over an inner surface of the first substrate adjacent to the liquid crystal layer.

8. The liquid crystal display device according to claim 7, further comprising a second retardation film over an outer surface of the first substrate.

9. The liquid crystal display device according to claim 1, further comprising a portional retardation film disposed over an inner surface of the first substrate adjacent to the liquid crystal layer, wherein the portional retardation film includes a first portion having a phase difference value greater than zero in the reflective region and a second portion having a phase difference value of zero in the transmissive region.

10. The liquid crystal display device according to claim 1, wherein the first angle is greater than the second angle.

11. The liquid crystal display device according to claim 10, wherein the first angle is twice as much as the second angle.

12. A liquid crystal display device, comprising:
   first and second substrates facing each other and including transmissive and reflective regions; and
   a liquid crystal layer between the first and second substrates, wherein the liquid crystal display device generates a first electric field having a first angle in the transmissive region and a second electric field having a second angle in the reflective region, the first and second angles different from each other with respect to a first plane parallel to one of the first and second substrates and a second plane vertical to one of the first and second substrates.

13. The liquid crystal display device according to claim 12, wherein the liquid crystal layer includes vertical alignment mode liquid crystal molecules.

14. The liquid crystal display device according to claim 12, wherein the first angle is greater than the second angle.

15. The liquid crystal display device according to claim 12, wherein the first angle is twice as much as the second angle.

16. The liquid crystal display device according to claim 12, further comprising a first retardation film between the liquid crystal layer and the first substrate.

17. The liquid crystal display device according to claim 16, wherein the first retardation film includes a first portion in the reflective region and having a retardation value between 0 and λ.

18. The liquid crystal display device according to claim 17, wherein the first retardation film includes a second portion in the transmissive region and having a retardation value of 0.

19. The liquid crystal display device according to claim 16, further comprising a second retardation film on an outer surface of the first substrate such that the first substrate is disposed between the first and second retardation films.

20. A method of fabricating a liquid crystal display device, comprising:

providing first and second substrates;

forming a first electric field distorting unit disposed in the transmissive region on one of the first and second substrates and having a first bent shape;

forming a second electric field distorting unit disposed in the reflective region on one of the first and second substrates and having a second bent shape; and forming a liquid crystal layer interposed between the first and second substrates, wherein the first bent shape has a first angle with respect to a first vertical direction of a first symmetrical axis of the first bent shape and the second bent shape has a second angle with respect to a second vertical direction of a second symmetrical axis of the second bent shape, and the first angle is different from the second angle.

* * * * *